US011911334B2

(12) United States Patent
Xiao

(10) Patent No.: US 11,911,334 B2
(45) Date of Patent: Feb. 27, 2024

(54) MASSAGE DEVICE

(71) Applicant: Aukey Technology Co., Ltd, Shenzhen (CN)

(72) Inventor: Xigen Xiao, Shenzhen (CN)

(73) Assignee: Aukey Technology Co., Ltd, Shenzhen (CN)

( * ) Notice: Subject to any disclaimer, the term of this patent is extended or adjusted under 35 U.S.C. 154(b) by 161 days.

(21) Appl. No.: 17/239,687

(22) Filed: Apr. 26, 2021

(65) Prior Publication Data

US 2022/0233398 A1 Jul. 28, 2022

(30) Foreign Application Priority Data

Jan. 27, 2021 (CN) ........................ 202120234243.7

(51) Int. Cl.
*A61H 23/02* (2006.01)

(52) U.S. Cl.
CPC ..... *A61H 23/02* (2013.01); *A61H 2201/0107* (2013.01); *A61H 2201/0207* (2013.01); *A61H 2201/1671* (2013.01); *A61H 2201/1683* (2013.01)

(58) Field of Classification Search
CPC ............ A61H 23/02; A61H 2201/0107; A61H 2201/0207; A61H 2201/1671; A61H 2201/1683; A61H 2201/0228; A61H 2201/1215; A61H 15/02; A61H 15/0078; A61H 2205/04; A61H 2007/009; A61H 7/004
See application file for complete search history.

(56) References Cited

U.S. PATENT DOCUMENTS

2006/0129072 A1* 6/2006 Shin ....................... A61H 7/004 601/87
2012/0010544 A1* 1/2012 Chen ...................... A61H 7/005 601/134
2013/0245515 A1* 9/2013 Chen ...................... A61H 7/007 601/101
2021/0186802 A1* 6/2021 Li ...................... A61H 23/0254
2021/0307995 A1* 10/2021 Zhou ...................... A61H 7/007

FOREIGN PATENT DOCUMENTS

CN 205268526 U * 6/2016

* cited by examiner

*Primary Examiner* — Justine R Yu
*Assistant Examiner* — Kelsey E Baller

(57) ABSTRACT

A massage device includes a base, a driving module, a massage head, an enclosure, and a heating module. The massage head is connected to the driving module, a side of the massage head away from the base is provided with a massage protrusion, and a first cavity is formed on a side of the massage head facing the base. The enclosure is arranged between the base and the massage head, an end of the enclosure away from the base is arranged close to an end of the massage head close to the base, a second cavity in communication with the first cavity is formed in the enclosure, and the second cavity and the first cavity jointly form a heating chamber. The heating module is accommodated in the heating chamber and fixed relative to the base.

13 Claims, 4 Drawing Sheets

MASSAGE DEVICE

CROSS-REFERENCE TO RELATED APPLICATIONS

This application is based upon and claims priority to Chinese Patent Application No. 202120234243.7, filed with the Chinese Patent Office on Jan. 27, 2021, titled “MASSAGE DEVICE”, the entire contents of which are incorporated herein by reference.

The present invention was made by, or on behalf of, one or more parties to a joint research agreement and was made as a result of activities undertaken within the scope of the joint research agreement. The names of the parties to the joint research agreement are Aukey Technology Co.,Ltd and Xiamen Emoka Health Science & Technology Co., Ltd.

TECHNICAL FIELD

Embodiments of the present application relate to the technical field of massage equipment, and in particular, to a massage device.

BACKGROUND

A massage device is a health product developed based on the principles of traditional meridian massage and modern medical massage. Currently, common massage devices on the market include massage pillows and massage cushions. Generally, a massage device includes a base, a massage head, and a driving module. The driving module is configured to drive the massage head to rotate so as to provide users with massage or percussion experience.

In addition, some massage devices further include a heating module, which is configured to heat the massage head, so as to increase user comfort and avoid poor user experience due to a low temperature of the massage head in a low temperature environment.

SUMMARY

An embodiment of the present application provides a massage device, including:

a base;

a driving module, which is mounted on the base;

a massage head, which is connected to the driving module so as to be driven by the driving module to rotate relative to the base, where a side of the massage head away from the base is provided with a massage protrusion, and a first cavity is formed on a side of the massage head facing the base;

an enclosure, which is arranged on the base and located between the base and the massage head, where an end of the enclosure away from the base is arranged close to an end of the massage head close to the base, a second cavity in communication with the first cavity is formed in the enclosure, and the second cavity and the first cavity jointly form a heating chamber; and a heating module, which is accommodated in the heating chamber and fixed relative to the base, and is configured to provide thermotherapy from the massage device.

BRIEF DESCRIPTION OF DRAWINGS

One or more embodiments are illustrated using corresponding accompanying drawings, and the illustration does not constitute a limitation on the embodiments. Elements having a same reference numeral in the accompanying drawings indicate similar elements, and unless otherwise stated, a figure in the accompanying drawings does not constitute a scale limitation.

In the drawings.

Figure 1:
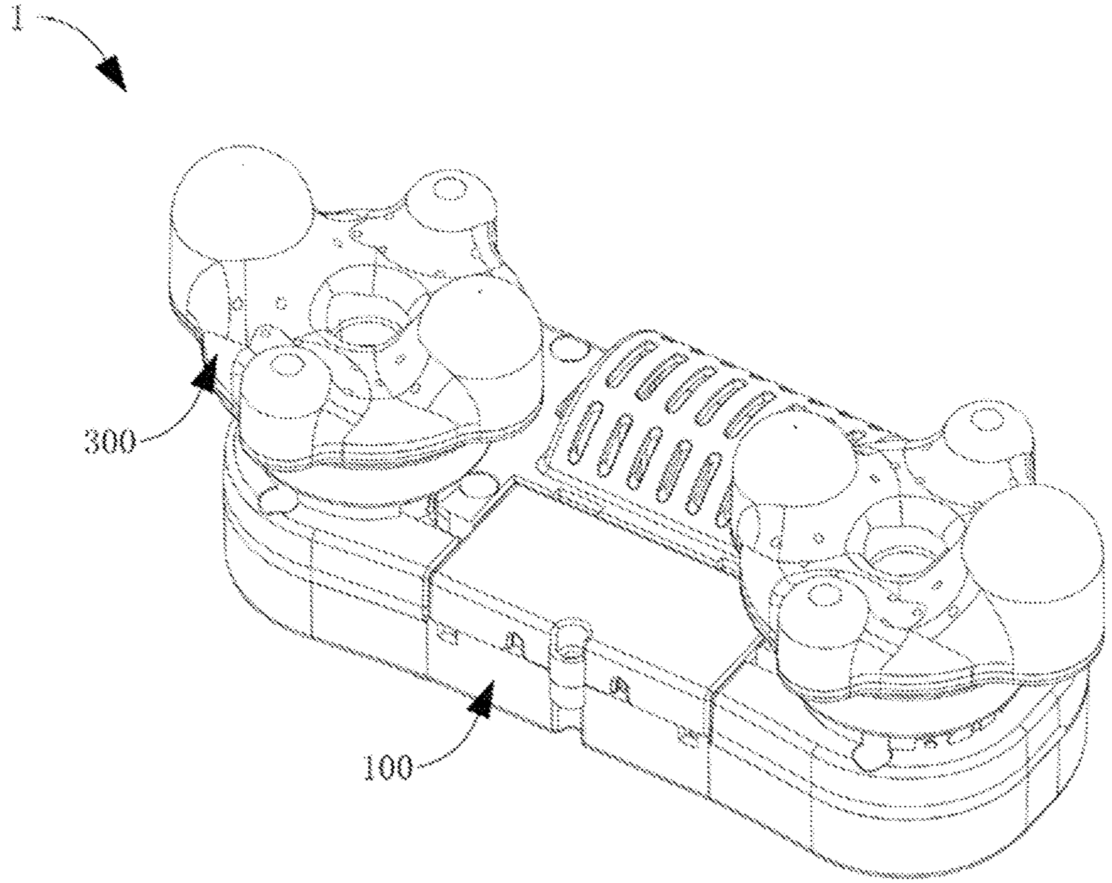
FIG. 1 is a schematic three-dimensional diagram of a massage device according to an embodiment of the present application.

- 1 and 1B: massage device;
- 100 and 100B: base; 110: upper housing; 120: lower housing; 101: accommodating cavity;
- 200 and 200B: driving module; 210: driving shaft; 220: power assembly;
- 300 and 300B: massage head; 310: massage protrusion; 320: connecting portion; 330: mounting portion; 301 and 301B: first cavity; 302: heat-permeable hole;
- 400 and 400B: enclosure; 410 and 410B: bottom plate; 420 and 420B: side wall; 430: supporting rib; 401 and 401B: second cavity;
- 500 and 500B: heating module; 510: circuit board; 520: heating element.

DETAILED DESCRIPTION

For ease of understanding of the present application, the following describes the present application in more detail with reference to accompanying drawings and specific embodiments. It should be noted that, when an element is expressed as being “fixed to”/“fixedly connected to”/“mounted to” another element, the element may be directly located on the another element, or there may be one or more intermediate elements in between; and when an element is expressed as being “connected to” another element, the element may be directly connected to the another element, or there may be one or more intermediate elements in between. The terms “vertical”, “horizontal”, “left”, “right”, “inner”, “outer”, and similar expressions used in this specification are merely intended for illustrative purposes.

Unless otherwise defined, all the technical and scientific terms used in this specification have the same meanings as those commonly understood by persons skilled in the art of the present application. The terms used in the specification of the present application are merely for the purpose of describing specific embodiments, and are not intended to limit the present application. The term “and/or” used in this specification includes any or all combinations of one or more associated listed items.

In addition, technical features included in different embodiments of the present application described below may be combined with each other provided that they do not conflict with each other.

In this specification, the “mounting” includes welding, screwing, clamping, bonding, etc. to fix or restrict a specific element or device to a specific position or place; the element or device may remain still in a specific position or place, or may move within a limited range; and the element or device can or cannot be detached after being fixed or restricted to the specific position or place, which is not limited in the embodiments of the present application.

In the related art, a heating module is mounted on an inner surface of the massage head and includes a brush with two contacts. Correspondingly, a ring-shaped conductive plate electrically connected to a control circuit board is mounted on the base, the ring-shaped conductive plate is provided with two coaxially arranged ring-shaped conductive copper rings, and the two contacts of the brush are respectively electrically connected to one of the conductive copper rings, so as to implement electrical connection between the heating module and the control circuit board mounted on the base.

In the process of implementing the present application, the inventor of the present application discovered that during the rotation of the brush with the massage head, the brush is likely to be in poor contact with the conductive copper rings. Consequently, the heating module cannot work continuously and stably.

Figure 2:
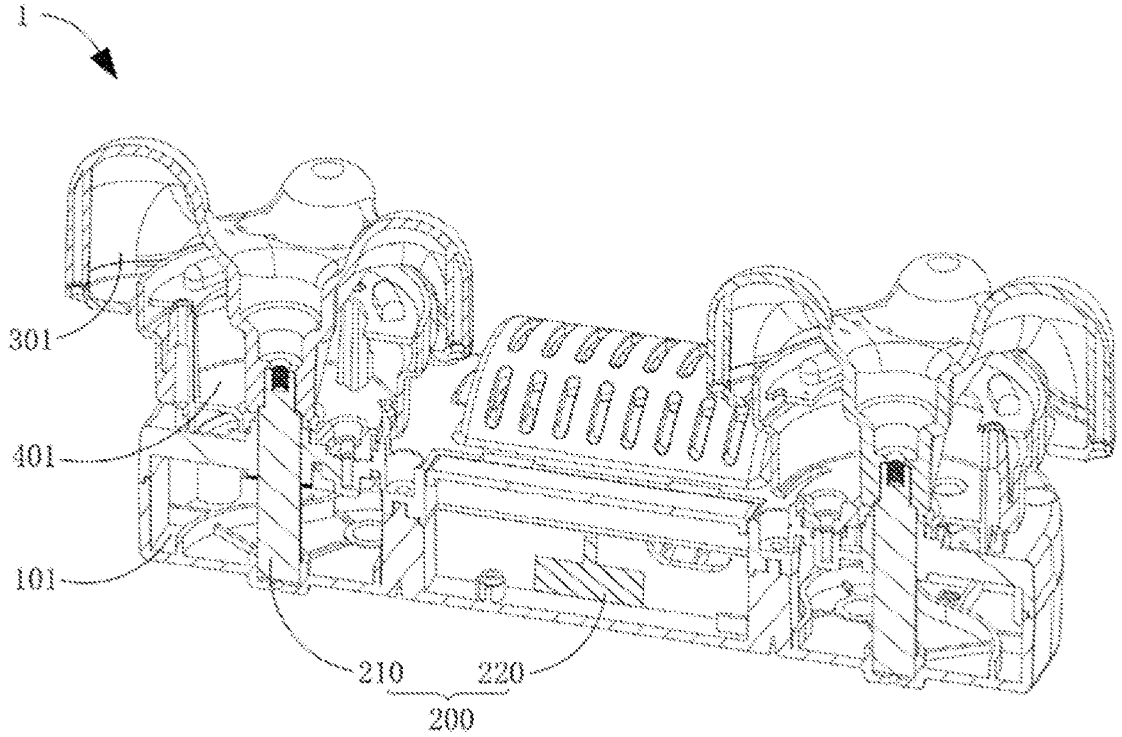
FIG. 2 is a schematic cross-sectional view of the massage device in FIG. 1 in one direction.
Figure 3:
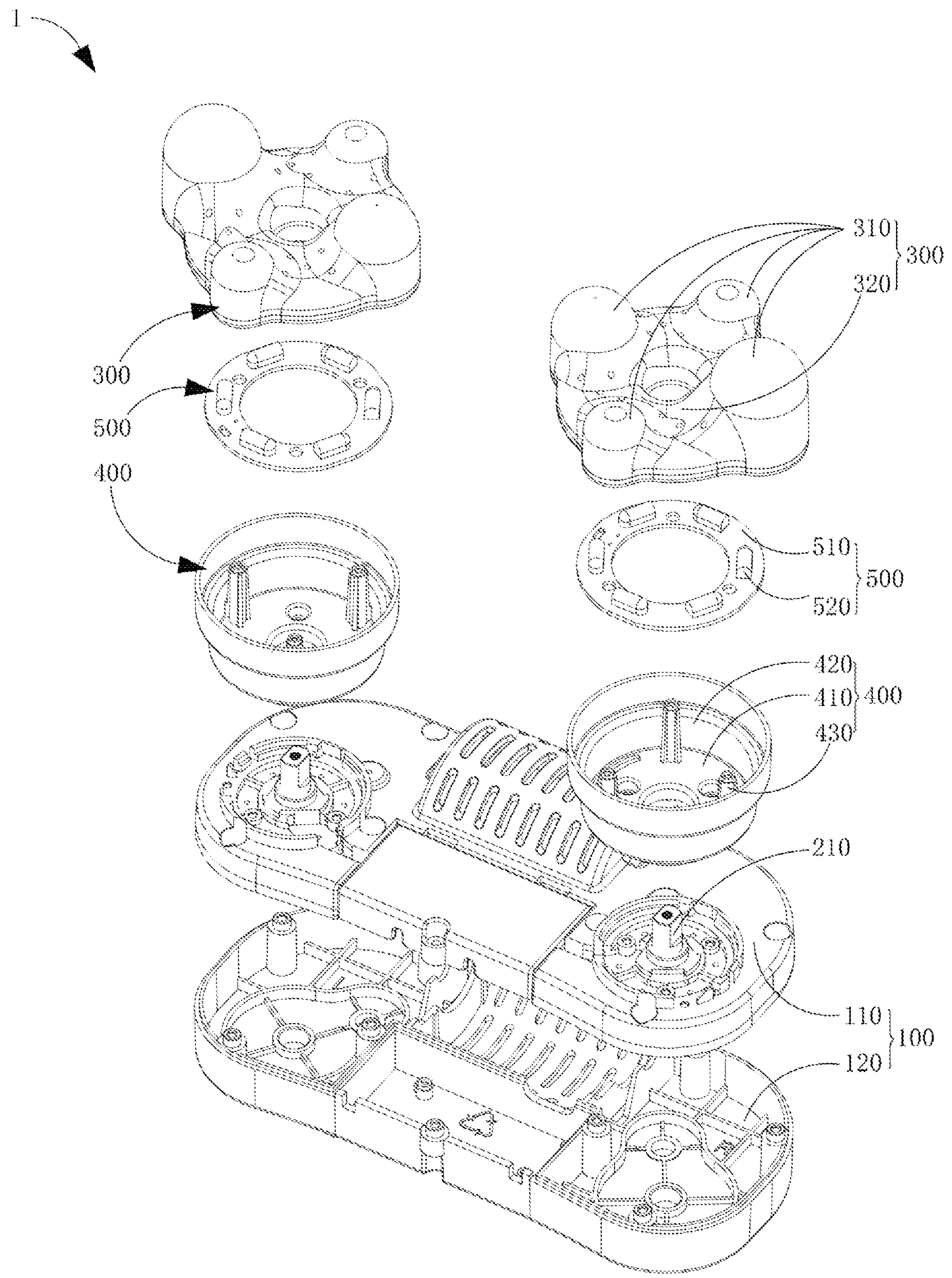
FIG. 3 is a schematic exploded diagram of the massage device in FIG. 1 in one direction.

FIG. 1 to FIG. 3 respectively show a schematic three-dimensional diagram of a massage device 1, a schematic cross-sectional view of the massage device 1 in one direction, and a schematic exploded diagram of the massage device 1 in one direction according to an embodiment of the present application. The massage device 1 includes a base 100, a driving module 200, a massage head 300, an enclosure 400, and a heating module 500. The base 100 is a supporting and mounting structure for the foregoing structures. The driving module 200 is mounted on the base 100 and is a driving structure of the massage head 300 for driving the massage head 300 to rotate. The massage head 300 is connected to the driving module 200 so as to be driven by the driving module 200 to rotate relative to the base 100. A side of the massage head 300 away from the base 100 is provided with a massage protrusion 310, and a first cavity 301 is formed on a side of the massage head 300 facing the base. The enclosure 400 is arranged on the base 100 and is located between the base 100 and the massage head 300. A free end of the enclosure 400 away from the base 100 extends into the first cavity 301, and an outer wall of the free end is arranged close to an inner wall of the massage head 300. A second cavity 401 in communication with the first cavity 301 is formed in the enclosure 400, and the second cavity 401 and the first cavity 301 jointly form a heating chamber. The heating module 500 is accommodated in the heating chamber and fixed relative to the base 100, and is configured to provide thermotherapy from the massage device 1 to a user's body parts such as neck and waist. To better understand a specific structure of the massage device 1, the following describes specific structures of the base 100, the massage head 300, the enclosure 400, the heating module 500, and the driving module 200 in sequence.

For the base 100, references are made to FIG. 1 to FIG. 3. The base 100 has a box-like structure as a whole, and is provided with an accommodating cavity 101 for accommodating at least a part of the driving module 200. Specifically, the base 100 includes an upper housing 110 and a lower housing 120, and the upper housing 110 and the lower housing 120 jointly form the accommodating cavity 101.

Figure 4:
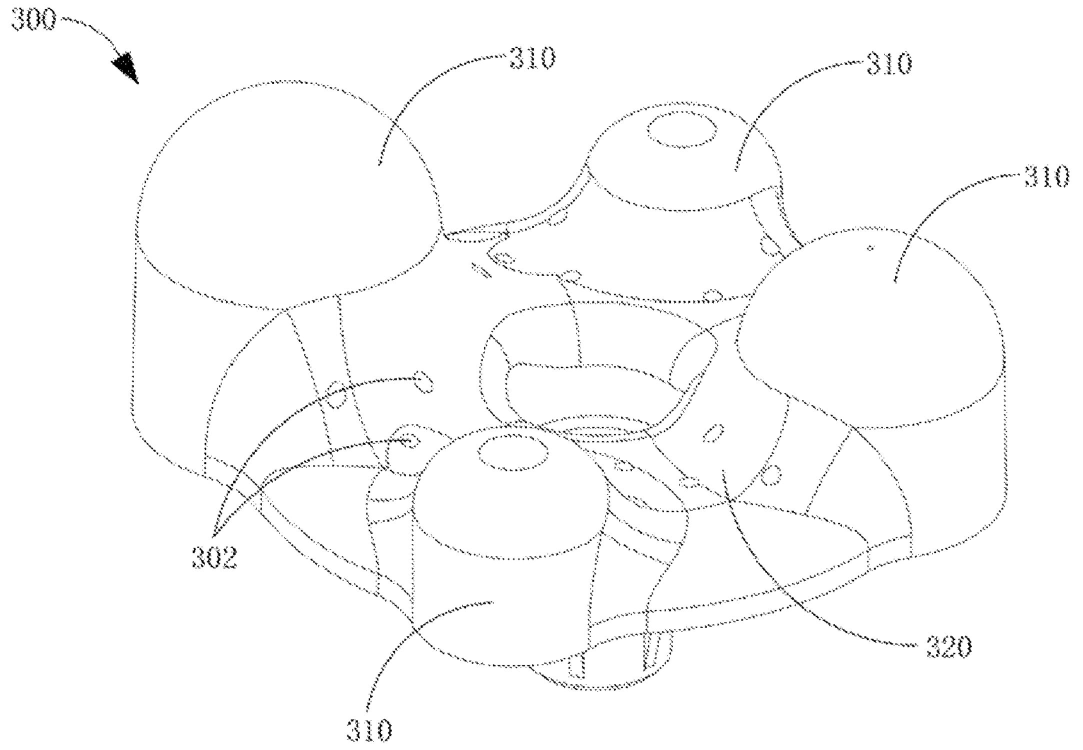
FIG. 4 is a schematic three-dimensional diagram of a massage head in FIG. 1 in one direction.
Figure 5:
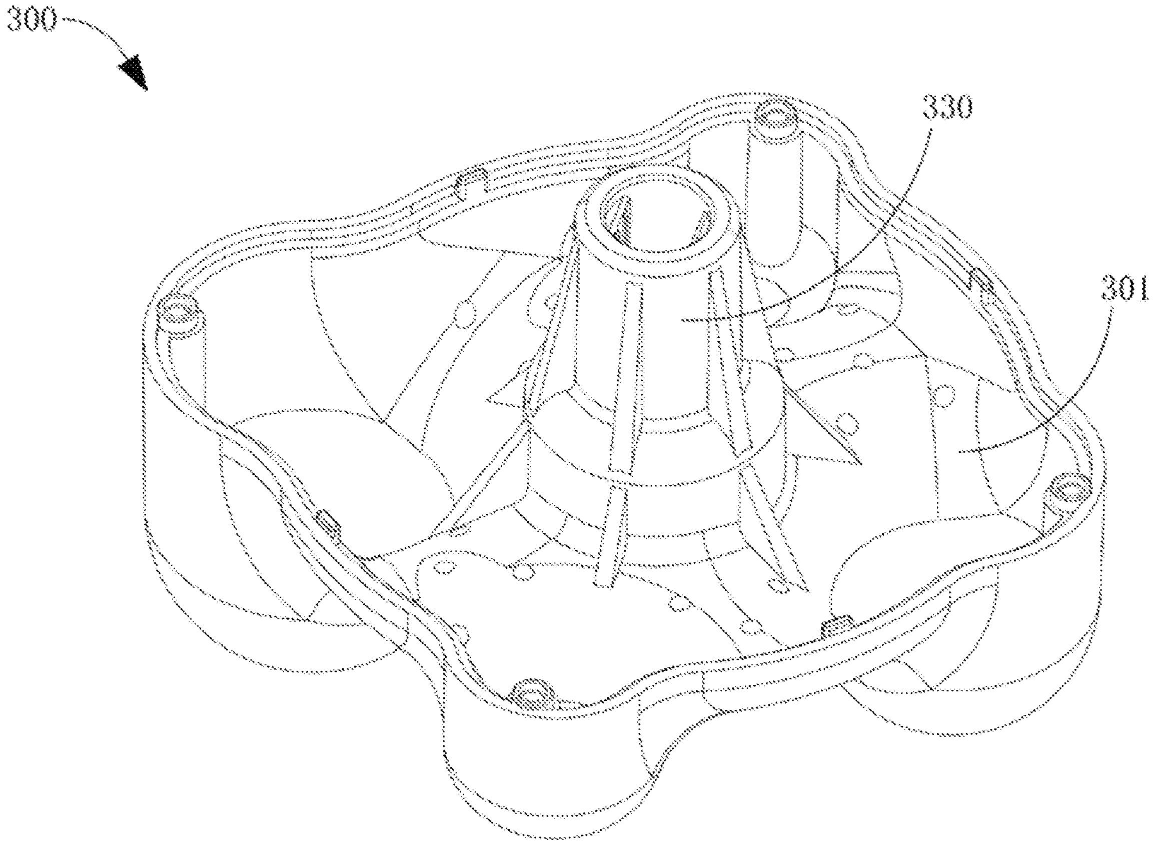
FIG. 5 is a schematic three-dimensional diagram of a massage head in FIG. 1 in another direction.

For the massage head 300, references are made to FIG. 4 and FIG. 5, which respectively show schematic three-dimensional diagrams of the massage head 300 in two directions. The massage head 300 is a structure that applies force to a user through rotation, so that the user experiences a massage effect. An end of the massage head 300 away from the base 100 is provided with a massage protrusion 310 for applying force to the user during the rotation of the massage head 300; and an end of the massage head 300 facing the base 100 defines a first cavity 301. In this embodiment, the massage head 300 includes a plurality of massage protrusions 310, and the massage protrusions 310 are connected and fixed through a connecting portion 320. Optionally, the massage head 300 includes four massage protrusions 310, and the massage protrusions 310 are respectively arranged at four corners of the connecting portion 320. Preferably, to ensure that the force applied by the massage head 300 to the user during the massage for the user can be changed intermittently, so that the user can feel a change in the pressing force, so as to better simulate the feeling of real massage and further improve the user's pressing experience, at least one of the massage protrusions 310 in the massage head 300 is different from the rest of the massage protrusions 310; and the "difference" may be a difference in shape or a difference in volume. Optionally, the massage device 1 includes two massage heads 300, and the two massage heads 300 are arranged on the same side of the base 100 at intervals.

For the enclosure 400, references are made to FIG. 3. The enclosure 400 is arranged between the base 100 and the massage head 300, and includes a bottom plate 410 and a side wall 420. The bottom plate 410 is fixed on an outer surface of the base 100. The side wall 420 extends from an edge of the bottom plate 410 toward the massage head 300, a free end of the side wall 420 extends into the first cavity 301, and the side wall 420 and the bottom plate 410 jointly form a second cavity 401. The second cavity 401 is in communication with the first cavity 301, which forms a heating chamber together with the first cavity 301. The heating module 500 is accommodated in the heating chamber to reduce a waste caused by direct escape of heat generated by the heating module 500 into the air from a gap between the massage head 300 and the base 100. Preferably, an outer wall of the free end of the enclosure 400 extending into the first cavity 301 is arranged close to an inner wall of the massage head 300, so as to reduce a rate of escape of heat generated by the heating module 500 from the heating chamber through a gap between the enclosure 400 and the massage head 300, and at the same time, to prevent the massage head 300 from rubbing against the enclosure 400 during the rotation. A fitting gap between the outer wall of the free end of the enclosure 400 and the inner wall of the massage head 300 is relatively small, and is usually controlled within 3 millimeters (mm). For example, the fitting gap is less than 2 mm. For another example, the fitting gap is 1 mm. In this embodiment, the enclosure 400 and the base 100 are formed separately, and are fixedly connected through screwing, clamping, etc. It can be understood that in other embodiments of the present application, the enclosure 400 may alternatively be integrally formed with the base 100.

For the heating module 500, references are made to FIG. 3 and other drawings. The heating module 500, the massage head 300, and the enclosure 400 are in one-to-one correspondence. The heating module 500 is specifically accommodated in the second cavity 401, and includes a circuit board 510 and a heating element 520. The heating element 520 is mounted on the circuit board 510, and is electrically connected to the circuit board 510. Specifically, the enclosure 400 further includes a plurality of supporting ribs 430. The supporting ribs 430 are accommodated in the second cavity 401. One end of the supporting rib is fixed to the bottom plate 410 and the other end of the supporting rib extends toward the massage head 300. The supporting ribs 430 are distributed in a circular array around a rotation axis of the massage head 300. The circuit board 510 is in a ring shape arranged around a driving shaft 210, and is carried on the supporting ribs 430 and fixed to the supporting ribs 430. The heating element 520 is fixed on a side of the circuit board 510 away from the bottom plate 410, and is configured to generate heat when energized, so as to heat the massage head 300. When the massage device 1 is working, because the heating element 520 is fixed relative to the base 100 and the massage head 300 rotates above the heating element 520, the heating element 520 can heat various parts of the massage head 300 to ensure that temperatures of various areas of the massage head 300 are basically the same. Optionally, the heating element 520 includes a miniature tungsten lamp, which is an element that can emit light and generate heat when energized, and can be purchased directly on the market. It can be understood that in other embodiments of the present application, the heating element may alternatively be another element such as a heating wire, provided that it can generate heat when energized. Preferably, to further make a heating effect of the heating module 500 on the massage head 300 more uniform, the heating module 500 specifically includes a plurality of heating elements 520, and the heating elements 520 are distributed in a circular array around the rotation axis of the massage head 300.

Further, when a user is being massaged, to enable a part of the heat generated by the heating module 500 to rush to the user's body part through the massage head 300 to achieve a better thermotherapy effect, the massage head 300 is provided with a number of heat-permeable holes 302. The heat-permeable hole 302 is arranged through the massage head 300 to communicate the first cavity 301 with an external environment of the massage head 300. As such, when the heating module 500 generates heat, the heat escapes to the outside of the massage device 1 through the heat-permeable hole 302 and flows to the user, thereby enhancing the thermotherapy effect.

Finally, the driving module 200 is described. Referring to FIG. 2 and other drawings, the driving module 200 includes a driving shaft 210 and a power assembly 220. The driving shaft 210 is connected to the massage head 300 in one-to-one correspondence. The power assembly 220 is connected to each driving shaft 210, and the power assembly 220 is configured to drive the driving shaft 210 to rotate, so that the massage head 300 is driven by the driving shaft 210 to rotate relative to the base 100.

Specifically, the driving shaft 210 is rotatably mounted on the base 100; a part of the driving shaft 210 is accommodated in the accommodating cavity 101; and a part of the driving shaft 210 extends out of the base 100, then passes through the bottom plate 410 of the enclosure 400, and extends into the second cavity 401. The massage head 300 is fixed to the part of the driving shaft 210 extending into the second cavity 401, so as to be rotatably mounted on the base 100. In this embodiment, a middle position of the massage head 300 extends toward the base 100 to form a mounting portion 330; and the mounting portion 330 has a cylindrical shape, at least partially extends into the second cavity 401, and is connected to the driving shaft 210. Optionally, the mounting portion 330 is detachably connected to the driving shaft 210 through threading, interference fitting, etc.

The power assembly 220 is separately connected to the two driving shafts 210 described above. In this embodiment, the power assembly 220 includes a driving motor (not shown in the figure) and two transmission modules (not shown in the figure). The driving motor is separately connected to the two transmission modules, and a transmission module is correspondingly connected to a driving shaft 210, so that the massage device 1 can drive, through the driving motor, the driving shaft 210 to rotate, and then drive the corresponding massage head 300 to rotate. Optionally, rotation directions of the two driving shafts 210 are opposite, so that the two massage heads 300 can squeeze a user's muscles toward each other during operation, so as to achieve a better massage effect. Optionally, the transmission module includes a gear group. It can be understood that in other embodiments, the transmission module may alternatively be another mechanism capable of implementing rotational output. For example, in some other embodiments of the present application, the transmission module may further include a synchronous belt mechanism, or may include both a gear group and a synchronous belt mechanism.

It should be further understood that in other embodiments of the present application, the driving module 200 may alternatively have another structural form, provided that it is connected to the massage head 300 and can drive the massage head 300 to rotate. For example, in some embodiments, the driving module 200 includes only two driving motors, and one driving motor is correspondingly connected to one massage head 300. For another example, in some other embodiments, the driving module 200 includes a driving motor and a transmission module, the driving motor is directly connected to one massage head 300 and the transmission module, and the other massage head 300 is connected to the transmission module. Specific structures of the driving module 200 are not listed one by one in the present application.

In addition to the foregoing structures, the massage device 1 further includes a control circuit board (not shown in the figure) for controlling the heating of the heating module 500 and controlling the operation of the driving module 200. Specifically, the control circuit board is a main control module of the massage device 1, and is accommodated in the accommodating cavity 101; and the heating module 500 and the driving module 200 are both connected to the control circuit board.

The massage device 1 provided in the embodiments of the present application includes a base 100, a driving module 200, a massage head 300, an enclosure 400, and a heating module 500. A side of the massage head 300 away from the base 100 is provided with a massage protrusion 310, and a first cavity 301 is formed on a side of the massage head 300 facing the base 100. The driving module 200 is connected to the massage head 300 and configured to drive the massage head 300 to rotate. The enclosure 400 is arranged between the base 100 and the massage head 300, a free end of the enclosure 400 away from the base 100 extends into the first cavity 301, the enclosure 400 defines a second cavity 401 in communication with the first cavity 301, and the second cavity 401 and the first cavity 301 form a heating chamber. The heating module 500 is accommodated in the heating chamber and fixed relative to the base 100, and is configured to provide thermotherapy from the massage device 1 to a part of a human body.

In comparison with an existing massage device on the market, according to the massage device 1 provided in the embodiments of the present application, the heating module 500 is arranged to be fixed relative to the base 100, so that the heating module 500 in the massage device 1 is connected to the control circuit board without using a brush and a ring-shaped conductive plate. Therefore, the massage device 1 provided in the embodiments of the present application can solve the problem that a heating module of the existing massage device on the market cannot work continuously and stably due to poor contact between a brush and a conductive copper ring.

Figure 6:
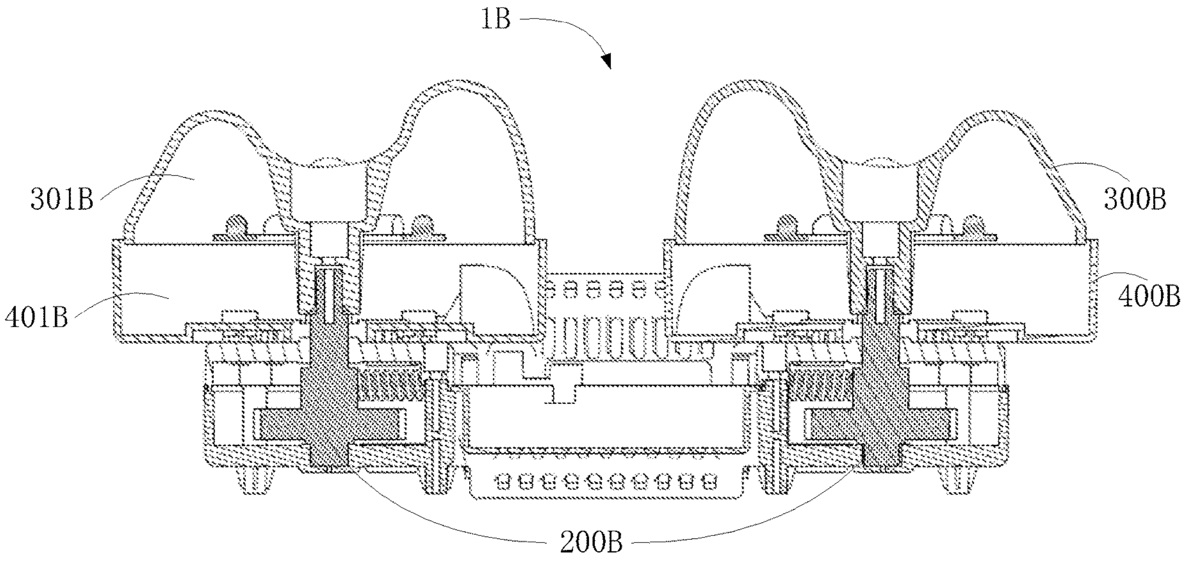
FIG. 6 is a schematic cross-sectional view of a massage device in one direction according to another embodiment of the present application.
Figure 7:
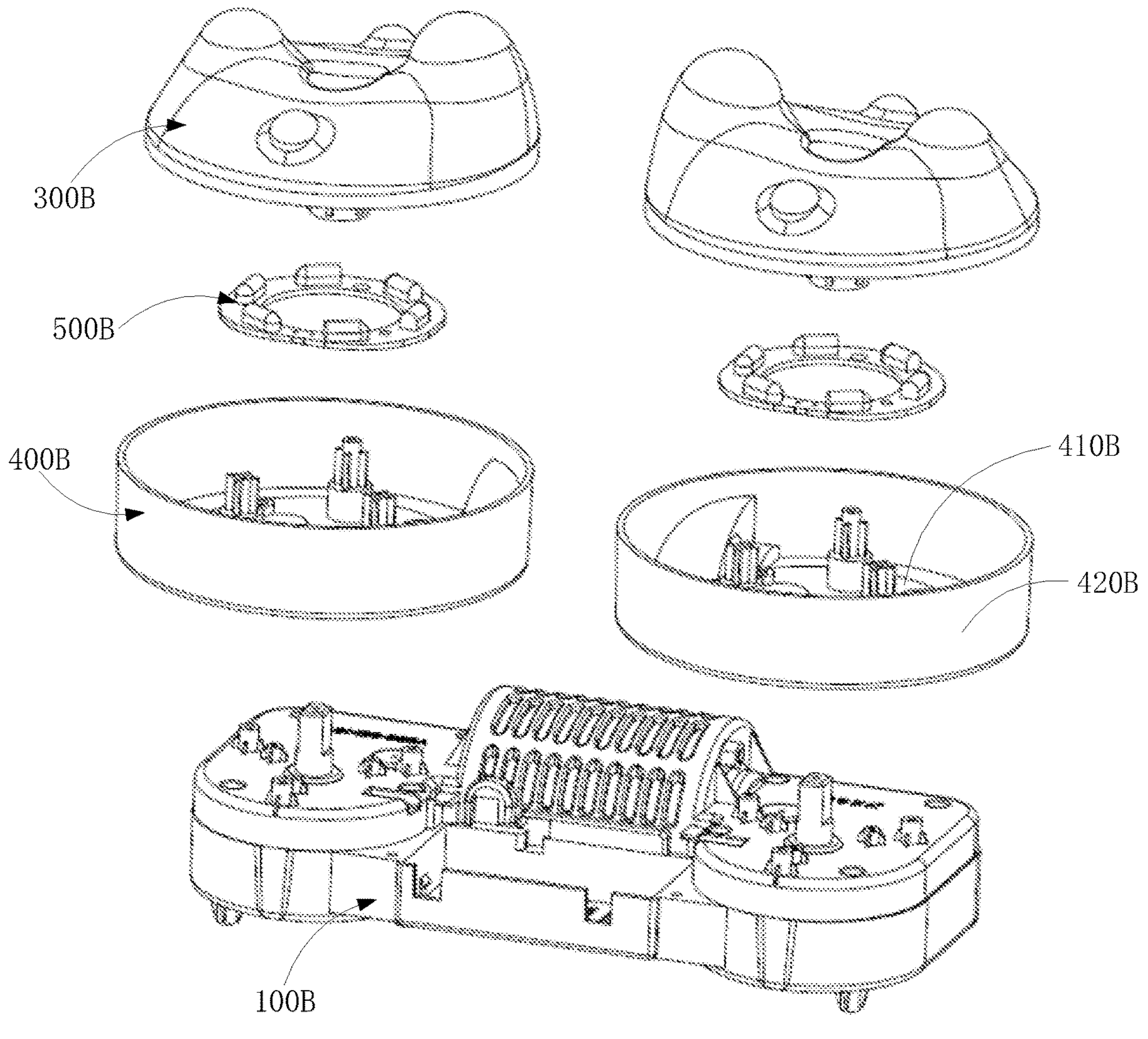
FIG. 7 is a schematic exploded diagram of the massage device in FIG. 6 in one direction.

Based on the same inventive concept, the present application further provides another massage device. FIG. 6 and FIG. 7 show a schematic cross-sectional view and a schematic exploded diagram of a massage device 1B in one direction according to another embodiment of the present application. Same as the massage device 1 in the first embodiment, the massage device 1B includes a base 100B, a driving module 200B, a massage head 300B, an enclosure 400B, and a heating module 500B. References are made to FIG. 2, and main differences between the massage device 1B and the massage device 1 in the first embodiment are as follows:

The free end of the enclosure 400 of the massage device 1 away from the base 100 extends into the first cavity 301, and the outer wall of the free end is arranged close to the inner wall of the massage head 300. However, in the second embodiment, an open end of the massage head 300B close to the base 100B extends into the enclosure 400B, an outer wall of the open end is arranged close to an inner wall of the enclosure 400B, and an outer diameter of the open end of the massage head 300B is slightly smaller than an inner diameter of the inner wall of the enclosure 400B. A difference between the outer diameter of the open end of the massage head 300B and the inner diameter of the inner wall of the enclosure 400B can be controlled within 3 millimeters (mm). For example, the difference is less than 2 mm. For another example, the difference is 1 mm.

Specifically, the end of the massage head 300B close to the base 100B is an open end, and the open end is in communication with a first cavity 301B; the enclosure 400B includes a bottom plate 410B and a side wall 420B; the bottom plate 410B is fixed on an outer surface of the base 100B; the side wall 420B extends from an edge of the bottom plate 410B toward the massage head 300B; and the side wall 420B and the bottom plate 410B jointly form a second cavity 401B. The open end of the massage head 300B extends into the end of the enclosure 400B away from the base 100B, and the outer wall of the open end is arranged close to the inner wall of the side wall 420B. The second cavity 401B is in communication with the first cavity 301B through the open end of the massage head 300B, and the second cavity 401B and the first cavity 301B jointly form a heating chamber.

The heating module 500B is accommodated in the second cavity 401B, and can heat the massage head 300B when the massage device 1B is working. Because the heating module 500B is fixed relative to the base 100B, and the massage head 300B rotates above the heating element 520, the continuous and stable operation of the heating module 500B can be ensured.

In other embodiments, the open end of the massage head 300B may not extend into the enclosure 400B, but is arranged above the enclosure 400B. In this case, there is an up-and-down gap between the open end of the massage head 300B and the end of the enclosure 400B away from the base 100B. Likewise, the gap is controlled within 3 millimeters (mm) to reduce a rate of escape of heat generated by the heating module 500B from the heating chamber through a gap between the enclosure 400B and the massage head 300B, and at the same time, to prevent the massage head 300B from rubbing against the enclosure 400B during the rotation.

Finally, it should be noted that the foregoing embodiments are merely intended for describing the technical solutions of the present application, but not for limiting the present application. Under the idea of the present application, the technical features in the foregoing embodiments or in different embodiments can be combined, the steps can be implemented in any order, and there are many other changes in different aspects of the present application described above. For brevity, they are not provided in detail. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A massage device, comprising:

a base;

a driving module, which is mounted on the base;

a massage head, which is connected to the driving module so as to be driven by the driving module to rotate relative to the base, wherein a side of the massage head away from the base is provided with a massage protrusion, and a first cavity is formed on a side of the massage head facing the base;

an enclosure, which is arranged on the base and located between the base and the massage head, wherein a free end of the enclosure away from the base extends into the first cavity, and an outer wall of the free end is arranged close to an inner wall of the massage head, a gap between the outer wall of the free end of the enclosure and the inner wall of the massage head is within 3 millimeters, a second cavity in communication with the first cavity is formed in the enclosure, and the second cavity and the first cavity jointly form a heating chamber; and a heating module, which is accommodated in the heating chamber and fixed relative to the base, and is configured to provide thermotherapy from the massage device.

2. The massage device according to claim 1, wherein the enclosure comprises a bottom plate and a side wall, and the bottom plate and the side wall jointly form the second cavity; and the bottom plate is fixed to the base, the side wall extends from the bottom plate toward the massage head, and a free end of the side wall extends into the first cavity.

3. The massage device according to claim 1, wherein the enclosure and the base are integrally formed.

4. The massage device according to claim 1, wherein the massage head is provided with a number of penetrating heat-permeable holes.

5. The massage device according to claim 1, wherein the heating module comprises a circuit board and a heating element; and the heating element is mounted on the circuit board and is electrically connected to the circuit board, and the heating element is configured to generate heat when energized.

6. The massage device according to claim 5, wherein the heating module comprises a plurality of heating elements, and the heating elements are distributed in a circular array around a rotation axis of the massage head.

7. The massage device according to claim 1, wherein the driving module comprises a driving shaft; and the massage head is connected to the driving shaft so as to be driven by the driving shaft to rotate relative to the base.

8. The massage device according to claim 7, wherein a middle position of the massage head extends toward the base to form a mounting portion, and at least a part of the mounting portion extends into the second cavity and is detachably connected to the driving shaft.

9. The massage device according to claim 7, wherein the massage device comprises two massage heads, two enclosures, and two heating modules in one-to-one correspondence; and the driving module has two driving shafts with opposite rotation directions, and the two driving shafts are connected to the two massage heads in one-to-one correspondence.

10. The massage device according to claim 1, wherein the massage head is provided with a plurality of massage protrusions, and in a same massage head, at least one of the massage protrusions is different from the rest of the massage protrusions.

11. The massage device according to claim 1, wherein the enclosure comprises a plurality of supporting ribs accommodated in the second cavity, and one end of a supporting rib is fixed to the bottom plate, the other end of the supporting rib extends toward the massage head.

12. The massage device according to claim 11, wherein the supporting ribs are distributed in a circular array around a rotation axis of the massage head.

13. The massage device according to claim 12, wherein the heating module comprises a circuit board and a heating element; and the circuit board is carried on the supporting ribs and fixed to the supporting ribs;

the heating element is mounted on the circuit board and is electrically connected to the circuit board, and the heating element is configured to generate heat when energized.

* * * * *